Figure 1:
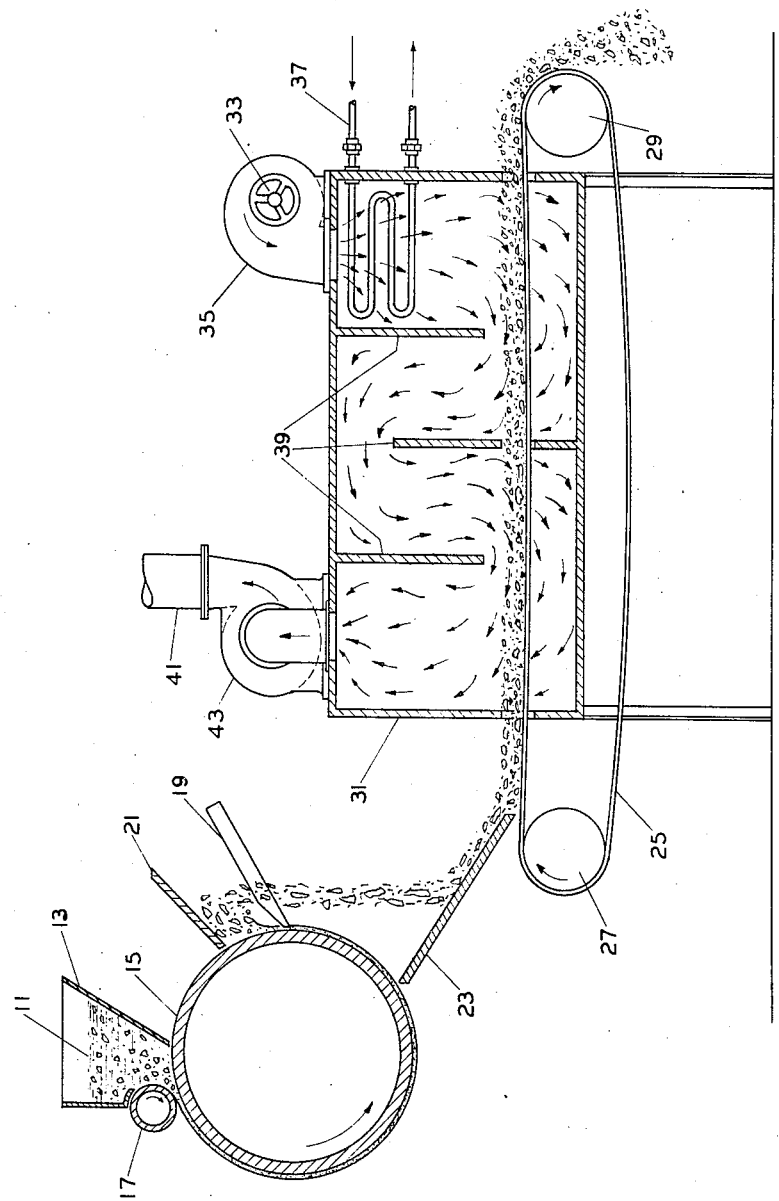

Sept. 27, 1949.  E. G. ALMY  2,483,254
PRODUCTION OF DRY SORBITOL
Filed Jan. 3, 1946  2 Sheets-Sheet 1

Ernest G. Almy,
*INVENTOR.*

Patented Sept. 27, 1949

2,483,254

UNITED STATES PATENT OFFICE 2,483,254

PRODUCTION OF DRY SORBITOL

Ernest G. Almy, Wilmington, Del., assignor to Atlas Powder Company, Wilmington, Del., a corporation of Delaware Application January 3, 1946, Serial No. 638,728

4 Claims. (Cl. 34—5)

1

This present invention relates to the production of dry sorbitol.

An object of the present invention is the provision of a dry sorbitol product.

A further object of the invention is the provision of a particulate dry sorbitol product.

Another object of the invention is the provision of a flaked dry sorbitol product.

Still another object of the invention is the provision of a dry sorbitol containing hexitol product.

Other objects of the invention will be apparent from the following description.

For some years the hexahydric alcohol, sorbitol, has been extensively prepared by the hydrogenation of aqueous solutions of glucose. As obtained by hydrogenation procedures, sorbitol is in the form of aqueous solutions, and it has usually been marketed in that form.

Attempts to dry sorbitol solutions by evaporation or normal drying procedures have resulted in gelled, glasslike, solid solutions which are highly hygroscopic and resist further drying.

While crystallization methods have been available for the production of dry sorbitol, these have involved considerable difficulties of control and have been time-consuming and delicate in operation. The later stages of crystallization have been particularly productive of difficulties.

It has also been suggested that liquid magmas be spread out in thin layers and dried. This procedure is time-consuming and tedious because drying must proceed slowly from the surface of a liquid material, and, because considerable care must be taken to prevent setting of the magma into the gelled solid state.

According to the present invention, a method is provided by which dry sorbitol may be obtained easily and rapidly. It has been found that warm, concentrated solutions of sorbitol, containing a large proportion of crystalline material, form firm, more or less friable, superficially dry, and non-tacky solids on cooling. Such congealed magmatic material sharply distinguishes from the rigid, glassy material resulting from the evaporation of sorbitol solutions, and thin layers of congealed magmas may be readily dried by usual drying procedures. The present process then, includes the steps of casting a warm magma of sorbitol crystals and solution into a thin layer, cooling the thin layer so as to congeal and harden it, and drying the thin layer of congealed magma. Preferably, the congealed material is broken up into small pieces prior to the drying step in order to expedite this operation.

2

More specifically, the magma treatment of the present invention may be carried out in a number of steps. First, a warm sorbitol magma may be spread on the surface of a cool cylindrical roll. Then the cooled, congealed magma may be removed from the roll by means of a doctor blade which breaks the magma into small flakes. The breaking of the magma may be assisted by a preliminary scoring of the magma, if necessary. The flakes produced can then be readily dried in a conveyor drier, preferably at progressively increasing temperatures.

Figure 2:

This process and product will be more clearly understood by reference to the drawing in which:

Fig. 1 diagrammatically shows an apparatus suitable for performing the invention, and Fig. 2 is a photograph of flakes of dried sorbitol produced according to the invention.

A magma 11 composed of sorbitol crystals and solution is run into a hopper 13 and coated onto large rotating roll 15 by means of a small heated coating roll 17. Roll 15 is preferably provided with means (not shown), such as an internal flow of cooling water, for chilling the surface. On cold roll 15 magma 11 forms a hard, congealed layer which, as the roll is rotated counter-clockwise, is carried around to a series of stationary knives, one of which appears as 19 on the drawing and obscures the others behind it. These knives score the layer forming it into thin ribbons. After passing the knives, the scored layer reaches doctor blade 21 which removes it from the roll and breaks it into small flakes. These flakes drop to apron 23 and slide down to endless traveling screen 25 which is driven by rolls 27 and 29. Screen 25 carries the flakes of congealed magma through drying chamber 31. Chamber 31 is provided with air inlet 33 through which fan 35 blows air into the chamber, steam coils 37 which heat the incoming air, and baffles 39 which direct the heated air countercurrently over the congealed sorbitol flakes to exit pipe 41 from which the air is discharged by means of fan 43. The dried sorbitol magma emerging from the drier 31 falls off screen 25 and is then ready for packing and shipment or for pulverization as is desired.

Numerous types of magma are advantageously dried by the process of the present invention. It is preferred, however, that water contents of magmas to be dried be sufficiently low that an adequate crystal content will be tolerated. Water contents as high as about 12% permit practicable functioning in this respect. On the other hand, water contents of magmas should not be so low that unduly stiff magmas need to be manipulated. Water contents as low as 8%, however, are quite satisfactory.

The process of the present invention is particularly adapted for the expeditious drying of solutions of relatively pure sorbitol, or of mixtures of sorbitol with as much as its own weight of other hexitols, such as mannitol, which are readily crystallizable and have melting points above about 150° C. It may be readily used, however, with magmas containing in addition to water as little as 80% of sorbitol or of a mixture, such as described above, of sorbitol and a high melting hexitol. The present invention finds especial utility in the drying of sorbitol and mannitol mixtures, for the presence of sorbitol inhibits mannitol crystallization under normal crystallizing conditions.

The magma to be dried should have a crystal content sufficiently high that the magma will congeal and harden at a practicable temperature; but, on the other hand, the crystal content should be sufficiently low that the magma is easily handled. Generally it will be found that magmas having crystal contents as low as 20% or as high as 30% will be quite satisfactory. They can be readily prepared and maintained at temperatures between about 60 and 68° C. and will congeal to desirable frangible masses if the surface of the cooling roll is maintained below about 25° C.

The congealed material while not porous may be readily dried if it is in sufficiently thin layers. Layers as thick as ⅛ inch may be adequately dried, but it is generally preferred that the layer thickness be no more than about 3/64 inch. Still more preferably the layer thickness is about 1/32 inch.

Although drying temperatures should be maintained high enough to maintain a practicable drying rate, they also should be maintained low enough to prevent the sorbitol particles from losing their hardness and becoming sticky or gummy. If the particles do become adhesive, they will tend to set up into the glassy condition from which they cannot be practicably dried.

As the water content of the drying particles decreases, the softening temperature rises, and consequently, the drying temperature may be increased so as to shorten the time of drying. While constant temperature drying may be employed, it will generally be found more practical to dry the hardened magma between temperatuers of about 110 and 160° F., lower temperatures being employed during the first part of the operation and the temperature being progressively increased until the highest temperatures are reached in the last part of the operation. While when a progressively increasing temperature is used, it is customarily preferred that the increase be substantially continuous, it will sometimes be found desirable to conduct the progressive increase stepwise as by means of two or more separate temperature stages.

It is usually preferred that the sorbitol be dried so that it contains a water content of not more than about 1%, for sorbitol of a greater water content is often unduly sensitive to ambient humidity conditions.

The sorbitol magma which is to be congealed and dried according to the present invention is preferably prepared by crystallization procedures from relatively high purity sorbitol solutions. Such solutions can be evaporated down to a solids content between about 88 and 92%, and then if they are seeded and crystallized in an agitated kettle maintained at a temperature between about 60 and 68° C. a magma of desired crystal content is obtained. Once crystallization has been initiated in a crystallizing kettle, it will be found that by proper adjustment of the rate of flow of sorbitol solution into the kettle and flow of crystallized product out of the kettle, a magma of a crystal content desirable for the present process may be continuously obtained.

The following example discloses a specific embodiment of the present invention.

*Example*

A sorbitol syrup of high purity is obtained by the catalytic hydrogenation of glucose and is evaporated to approximately 91.3% solids content. This syrup containing about 1% of glucose, about ½% of ash, sorbitol, and a small amount of other hexitol solids is added to a crystallizer which contains a small amount of crystalline sorbitol and is gently agitated therein at a temperature of about 62° C. for about 15 hours until the crystal content has grown to about 25.6%.

The magma so produced is passed through an apparatus of the type shown in the drawing and described above. It is first cast in a layer about 1/32 inch thick on the cooled flaking roll where it congeals and hardens. The roll then carries the hardened magma under scoring knives which cut it into ribbons about ½ inch wide. The magma then runs up against the doctor blade and is thereby broken into curled chips or flakes about two inches long. If the magma resists breaking and tends to come off in long ribbons, it may be scored laterally, as by a rotating knife, prior to reaching the doctor blade. From the flaking roll the flakes pass to the traveling screen on which they are loaded to a bed thickness of about eight inches and on which they are carried into the drier where heated air is blown through them. Where the flakes enter the drier, air heated to about 130° F. is employed, and this temperature is progressively increased to about 150° F. as the flakes move through the drier. The flakes leave the drier when their water content has been lowered to about ½ of 1%. Under the stated conditions the flakes must usually remain in the drier for a period of about 1½ hours. Fig. 2 of the drawing is a photograph of the flaked product.

The flaked product emerging from the drier may be used as such or may be pulverized to powdered form.

It will be appreciated that other drying procedures may be used to dry the congealed and hardened magma; for example, vacuum driers have been employed successfully. Also it will be evident that other methods of forming particles of congealed magma may be employed; for example, the magma may be cast into forms and cooled.

In another modification of the invention, the sorbitol magma, instead of being produced by crystallization, may be prepared by addition of dried powdered product to concentrated sorbitol solutions.

Further modification of the invention will be obvious to those skilled in the art.

It may be seen from the above description that a process has been provided for the simple and rapid production of dry sorbitol.

What is claimed is:

1. A process for the crystallization of sorbitol which comprises initiating crystallization in a sorbitol solution containing between about 8 and about 12% of water, gently agitating said solution at a temperature between about 60 and about 68° C. until a magma containing between about 20 and about 30% by weight of crystalline sorbitol is obtained, casting said magma in a layer not more than about 3/64 inch thick onto a smooth surface, cooling said surface to a temperature below about 25° C. so that said magma is congealed to a solid condition, removing and breaking said magma so as to form flaked particles, and drying said particles at progressively increasing temperatures between about 110° F. and about 160° F., but always below the temperatures at which the magma becomes sticky, until the magma contains less than about 1% of water.

2. A process according to claim 1 in which said surface is a casting roll, in which the removal of the magma from the casting roll is by means of a doctor blade, and in which the magma is scored prior to removal by the doctor blade so that on removal the magma forms curled flakes.

3. A process for the drying of sorbitol which comprises forming a magma of sorbitol crystals and sorbitol solution, said magma containing between about 8 and about 12% of water and having a crystal content between about 20 and about 30%; casting said magma into a layer not any more than 3/64 inch thickness onto a smooth surface, said surface being cooled to a temperature below about 25° C., removing and breaking said magma so that flaked particles are produced, and drying said particles at progressively increasing temperatures below those at which the magma becomes sticky.

4. A process according to claim 3 in which a mixture of sorbitol and mannitol is dried.

ERNEST G. ALMY.

REFERENCES CITED

The following references are of record in the file of this patent:

UNITED STATES PATENTS

| Number | Name | Date |
| --- | --- | --- |
| 1,235,716 | Mooney | Aug. 7, 1917 |
| 1,594,390 | Van Stone et al. | Aug. 3, 1926 |
| 1,771,139 | Novotny | July 22, 1930 |
| 1,932,364 | Martin | Oct. 24, 1933 |
| 1,980,898 | Abernathy | Nov. 13, 1934 |
| 1,981,806 | Lowry | Nov. 20, 1934 |
| 2,068,181 | Hurxthal | Jan. 19, 1937 |
| 2,198,617 | Hoelscher et al. | Apr. 30, 1940 |
| 2,315,699 | Goepp | Apr. 6, 1943 |
| 2,341,258 | Appel | Feb. 8, 1944 |